Sept. 27, 1932.     R. M. TEMPLE     1,879,774
SUPPORTING MEANS FOR AGITATOR MECHANISM
Filed Nov. 6, 1925
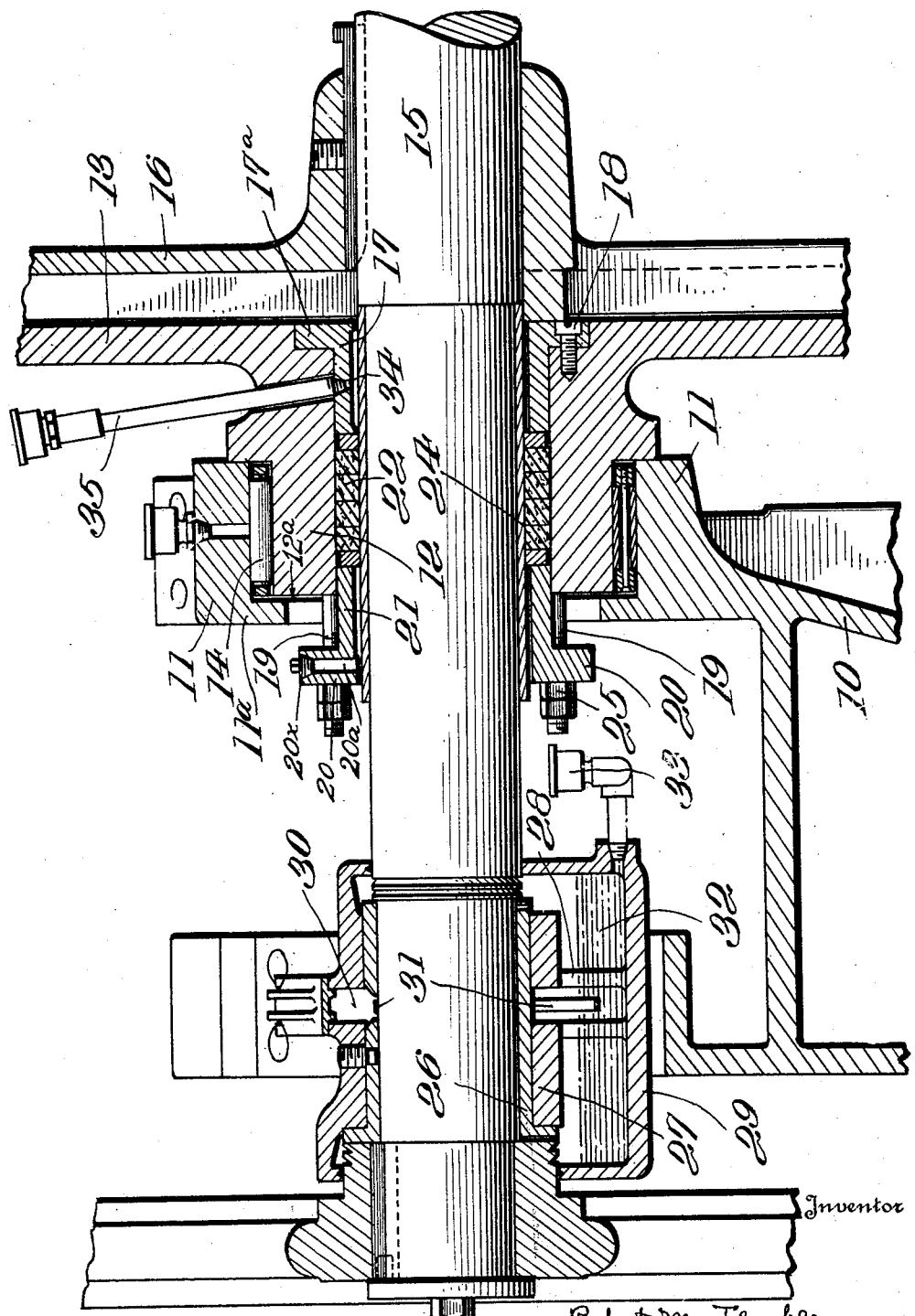

Patented Sept. 27, 1932

1,879,774

UNITED STATES PATENT OFFICE

ROBERT M. TEMPLE, OF PHILADELPHIA, PENNSYLVANIA

SUPPORTING MEANS FOR AGITATOR MECHANISM

Application filed November 6, 1925. Serial No. 67,393.

This invention comprises means for efficiently supporting the rotating parts of an agitator mechanism.

One of the objects of the invention is to provide an agitator with means for independently supporting the agitator casing and the agitator shaft in such manner as to permit of their relative concentric movement, and so supporting them as to relieve the packing of practically all casing supporting strain. A further object is to provide a bearing for the casing having a stuffing box through which the shaft extends, and bearing means for supporting the shaft in such relation to the stuffing box that the glands thereof do not contact with the shaft; but are left free to be readily manipulated for any adjustment of the packing necessary to maintain a tight joint. A further object is to provide simple and effective means for lubricating the shaft at the place where it passes through the stuffing boxes.

The invention will be hereinafter fully set forth and particularly pointed out in the claims.

In the accompanying drawing, the figure is a longitudinal sectional view illustrating a portion of an agitator with the invention applied thereto.

Referring to the drawing, 10 designates a base provided with a bearing 11, in which is rotatably mounted a bearing hub or boss 12, projecting from an end wall 13 of an agitator casing. The bearing 11 is provided with a stop flange 11a positioned to bear against a stop shoulder 12a on the hub 12. Suitable antifriction rollers 14 may be employed if desired. It will be noted that the hub or boss 12 extends into the bearing 11, which is in the form of a sleeve projecting laterally from the base 10 so as to enclose said boss, and provided with an annular stop flange.

The agitator shaft 15 is extended through the sleeve 12, and the agitator 16 is keyed to said shaft or otherwise secured to rotate therewith. The agitator casing, as well as the agitator and its shaft may be of any suitable or desired construction. It is preferred, however, to employ the form illustrated and described in Letters Patent 1,510,165, granted September 30, 1924, although it is to be understood that the present invention is not limited in its use to this construction. It will be noted that the diameter of the shaft 15 is substantially less than the diameter of the bore through the bearing sleeve 12.

The inner end of the bore of the hub or boss 12 is provided with an enlarged portion, as indicated in the drawing, to receive the flange 17a, of a packing abutment sleeve 17 which surrounds the shaft 15 and projects into the boss 12. Said sleeve is of greater internal diameter than the diameter of the shaft 15 and does not touch the same, being held in normally fixed position by means of screws 18, passed through said flange and engaging properly tapped openings in the contiguous portion of the sleeve.

Extending from the outer end of the sleeve 12 is a series of studs 19, preferably threaded upon their outer ends, said studs being positioned to engage suitable holes formed in the flange 20, of an adjustable gland sleeve 21, which also surrounds but does not touch the shaft 15 because the bore thereof is larger than the diameter of said shaft. The flange 20 is provided with a lubricating duct 20a closed by suitable means such as a screw plug 20x. Interposed between the adjacent ends of the sleeves 17 and 21 is suitable packing 22, which may be of any preferred type. The shaft is provided with a bronze sleeve or bushing 24 and the packing is maintained in close engagement with said sleeve or bushing 24 and the interior of the boss 12, by reason of pressure applied to the packing by adjustment of the sleeve 21. Such adjustment is accomplished by means of nuts 25 working on the threaded ends of the studs 19. By means of this arrangement any desired pressure may be applied to the packing to maintain a tight joint, without increasing the friction upon the shaft itself.

Enclosing a portion of the shaft near one end is a bearing bushing 26, which is mounted in a suitable bearing sleeve 27, carried by ribs 28, which extend from the bottom wall of an oil reservoir 29, supported by the base 10. The bushing 26 is provided with a cutaway portion indicated at 30, in which is located a lubricating ring 31, which encloses the shaft 15, and is suspended therefrom in such a manner that its lower portion extends into the oil or other lubricant 32 in the reservoir 29. The said reservoir may be supplied from a suitable compression device indicated at 33.

For the purpose of insuring proper lubrication of the shaft 15 where it passes through the gland sleeve 17, the latter is provided with a lubricant opening 34, in which is secured one end of a pressure feed lubricating device 35. By means of this device lard, or other proper lubricant may be forced into the space between the sleeve 17 and the bushing 24.

The parts above described are applied to one end of the agitator shaft and the agitator casing, but it is to be understood, are to be duplicated at the other end, so as to provide for the proper supporting of the agitator parts. Inasmuch however, as illustration of the other end of the device would amount to mere duplication, it is considered sufficient to illustrate one end only.

In practice, by reason of the diameter of the shaft 15 being much less than the diameter of the bore through the bearing sleeve 12, the entire weight of the shaft 15 and its agitator 16 are carried in the bearing sleeves 27, said shaft being entirely relieved of the weight of the casing 13, which is carried on its bearing sleeves 12. In this manner, the casing may be rocked in its bearings independently of the rotation of the shaft, at any time, without placing any weight whatever on the shaft, thereby relieving the stuffing glands 17 and 21 of all of the strains incident to the supporting of heavy rotating parts. Under these conditions, the sleeve 21 may be adjusted by means of the nuts 25, so as to apply the proper pressure upon the packing 22, thereby insuring a tight joint at all times. The lubrication of the stuffing box is provided by means of the device 35. The shaft itself, is lubricated in its bearing by means of the ring 31, which is caused to travel to some extent with the shaft, and in this way will raise lubricant from the reservoir 29 up to the top of the shaft, and deposit it in the notched portion 30 of the bushing, from whence it will be distributed in a well known manner.

The advantages of the invention will be readily apparent to those skilled in the art to which it belongs. It will be particularly noted that an important advantage is gained in so mounting the agitator casing and the agitator shaft as to take all of the supporting strain off of the shaft and the stuffing boxes, thereby enabling the latter to perform their functions more effectively by reason of relief from these strains. Thus the packing may be readily adjusted to maintain a tight joint and its life greatly prolonged. At the same time, the parts are effectively lubricated.

Having thus explained the nature of the invention and described an operative manner of constructing and using the same, although without attempting to set forth all of the forms in which it may be made, or all of the forms of its use, what is claimed is:—

1. Supporting means for agitator mechanism comprising a bearing, an agitator casing provided with a hub-like boss extended into and rotatably engaging said bearing, said boss having an axial bore therein, a second bearing spaced from the first mentioned bearing, an agitator shaft extending through the bore of said boss and having rotative engagement with said second bearing, the diameter of said shaft being substantially less than the diameter of said bore, so that the weight of the casing is supported by the first mentioned bearing and the weight of the agitator is carried by the other bearing, a sleeve-like abutment member extended into said bore from the inner end thereof, an adjustably mounted packing gland extended into said bore from the other end thereof, packing encircling said shaft and filling the space between the shaft and the wall of the bore, said packing being also interposed between and abutting the oppositely spaced ends of said abutment member and said gland, the bores of said abutment member and said packing gland being of a greater diameter than the diameter of the shaft, so that by adjustment of said packing gland leakage along the shaft into said casing is prevented and increased friction is avoided.

2. Supporting means for agitators comprising a bearing, an agitator casing provided with a hub-like boss extending into and rotatably engaging said bearing, said boss having an axial bore therein, a second bearing spaced from the first mentioned bearing, an agitator shaft extended through the bore of said boss and having its end rotatably engaging said second bearing, the diameter of said shaft being substantially less than the diameter of said bore, so that the weight of the casing is supported by the first mentioned bearing and the weight of the agitator is carried by the other bearing, a sleeve-like abutment member extended into said bore from the inner end thereof, said abutment member having a radial attaching flange abutting against the contiguous portion of the agitator casing, securing means engaging said flange and said casing to retain said abutment member in position, an adjustably mounted packing gland extended into said bore from the other end thereof, packing encircling said shaft and filling the space between the shaft and the wall of the bore, said packing being also interposed between and abutting the opposed ends of said abutment member and said gland, said abutment member and said packing gland having internal bores of greater diameter than the diameter of the shaft, so that relative adjustment of said gland and said abutment member will prevent leakage along said shaft and increased friction is avoided.

In testimony whereof I have hereunto set my hand.

ROBERT M. TEMPLE.